US007868935B2

(12) United States Patent
Egawa

(10) Patent No.: US 7,868,935 B2
(45) Date of Patent: Jan. 11, 2011

(54) SOLID-STATE IMAGING APPARATUS

(75) Inventor: Yoshitaka Egawa, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 732 days.

(21) Appl. No.: 11/283,824

(22) Filed: Nov. 22, 2005

(65) Prior Publication Data
US 2006/0114342 A1 Jun. 1, 2006

(30) Foreign Application Priority Data
Nov. 26, 2004 (JP) ............................. 2004-342432

(51) Int. Cl.
*H04N 9/64* (2006.01)
(52) U.S. Cl. ...................... 348/243; 348/251
(58) Field of Classification Search ................ 348/243, 348/245, 246, 251, 249, 294, 314, 241, 244, 348/222.1, 248, 247; 358/1.11
See application file for complete search history.

(56) References Cited

U.S. PATENT DOCUMENTS

| 6,614,473 | B1 * | 9/2003 | Kijima | 348/243 |
| 6,744,526 | B2 * | 6/2004 | McDermott et al. | 358/1.11 |
| 7,187,409 | B2 * | 3/2007 | Nakahira et al. | 348/243 |
| 7,432,965 | B2 * | 10/2008 | Mori | 348/243 |
| 7,652,698 | B2 * | 1/2010 | Morishita | 348/251 |
| 2002/0158294 | A1 * | 10/2002 | Fujiwara et al. | 257/431 |
| 2004/0233305 | A1 * | 11/2004 | Morishita | 348/245 |

FOREIGN PATENT DOCUMENTS

| JP | 10-256522 | 9/1998 |
| JP | 2000-224440 | 8/2000 |
| JP | 2000-261730 | 9/2000 |
| JP | 2000-287137 | 10/2000 |
| JP | 2002-77738 | 3/2002 |
| JP | 2004-15712 | 1/2004 |
| JP | 2004015712 A * | 1/2004 |

* cited by examiner

*Primary Examiner*—David L Ometz
*Assistant Examiner*—Ahmed A Berhan
(74) *Attorney, Agent, or Firm*—Oblon, Spivak, McClelland, Maier & Neustadt, L.L.P.

(57) ABSTRACT

An imaging area includes an effective pixel section and an optical black section. Pixel signals read out from the imaging area, onto a plurality of vertical signal lines, are converted by an AD conversion circuit. The converted pixel signals are sequentially input to a signal processing circuit for computing processing. The circuit is provided with a horizontal-stripe noise suppression circuit for averaging of output signals, on a plurality of lines, which are readout from an OB section at an end in the horizontal direction in the imaging area, and for adding and subtracting of the averaged result to effective-pixel signals.

6 Claims, 12 Drawing Sheets

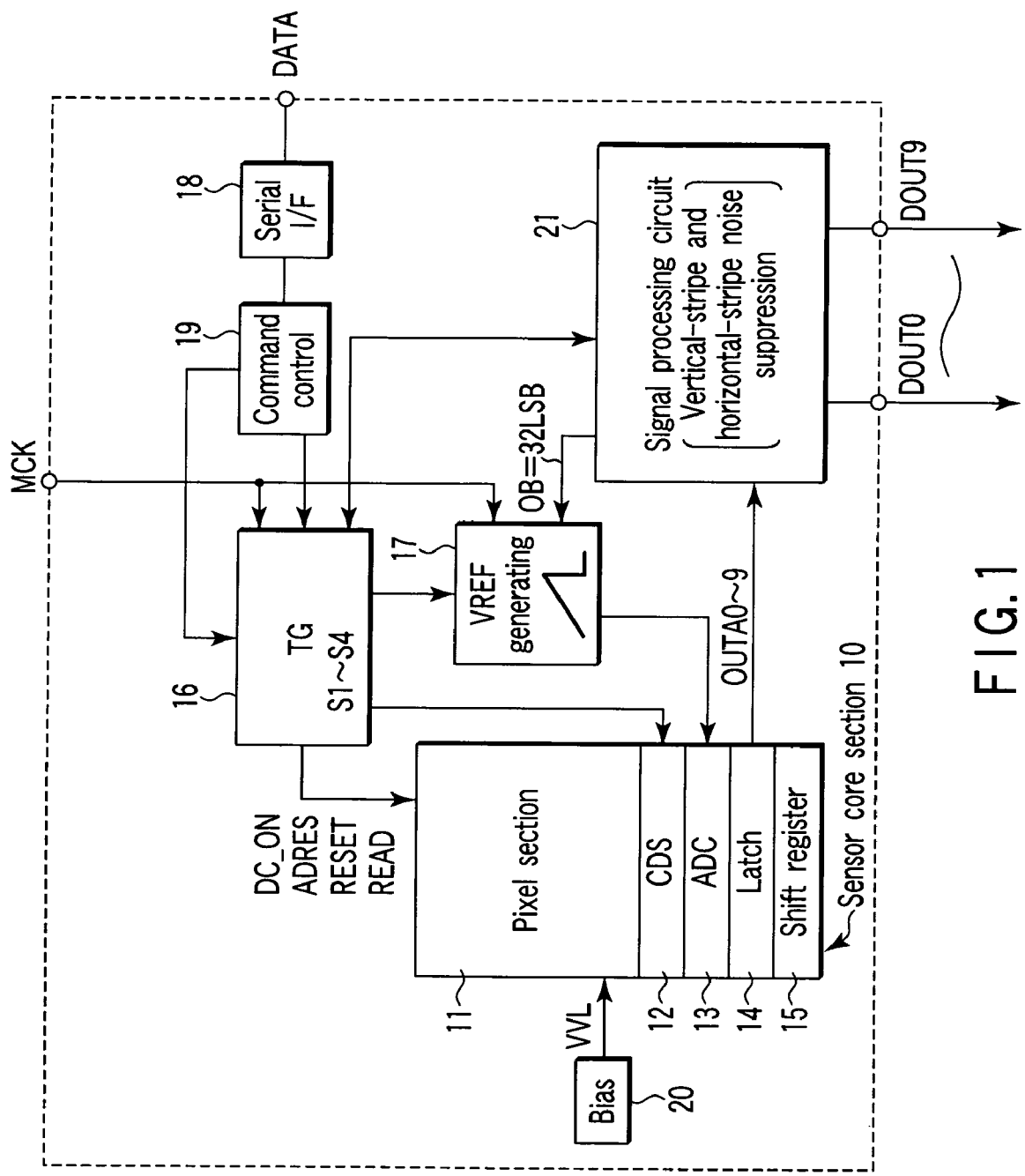
F I G. 1

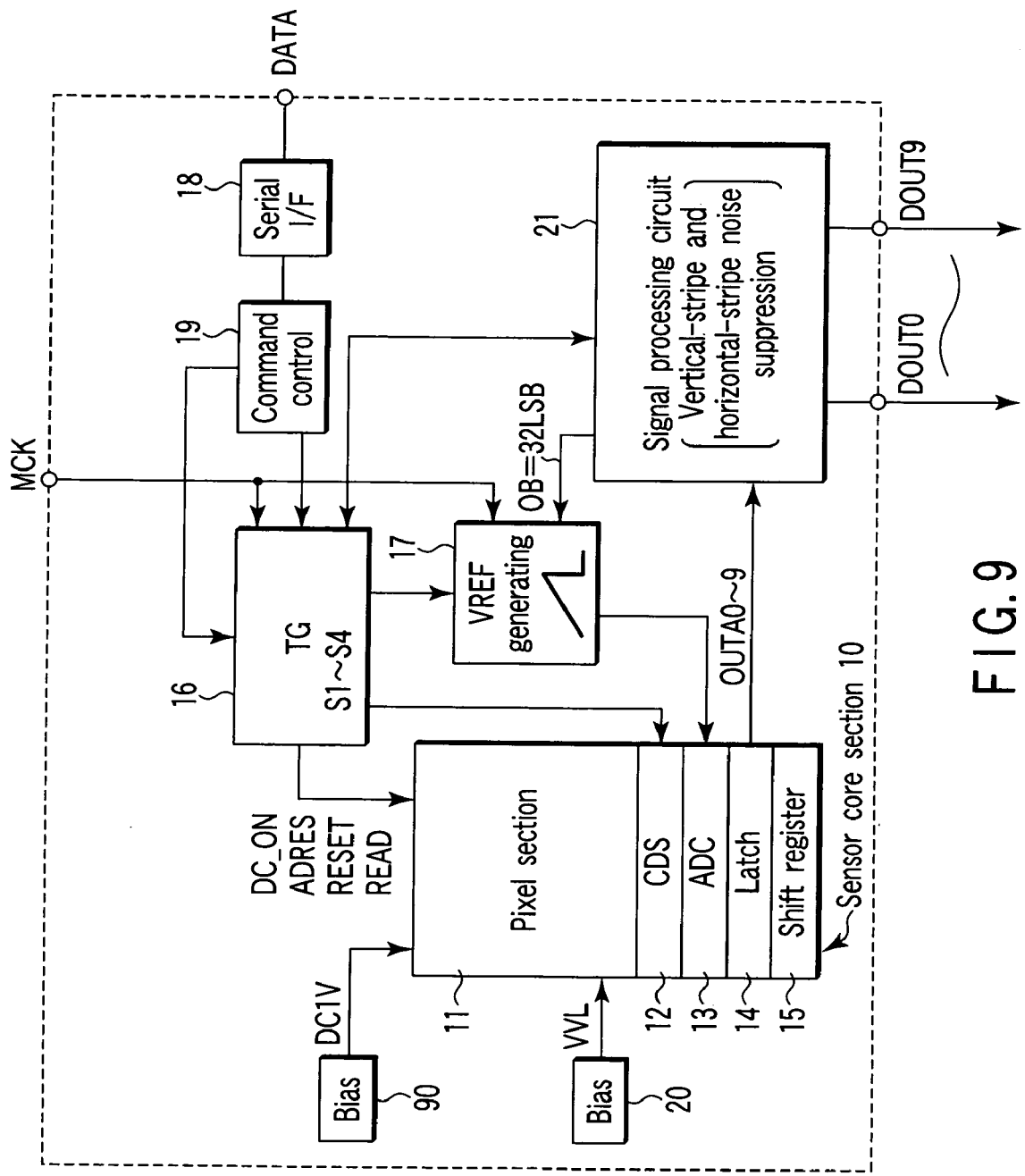
F I G. 9

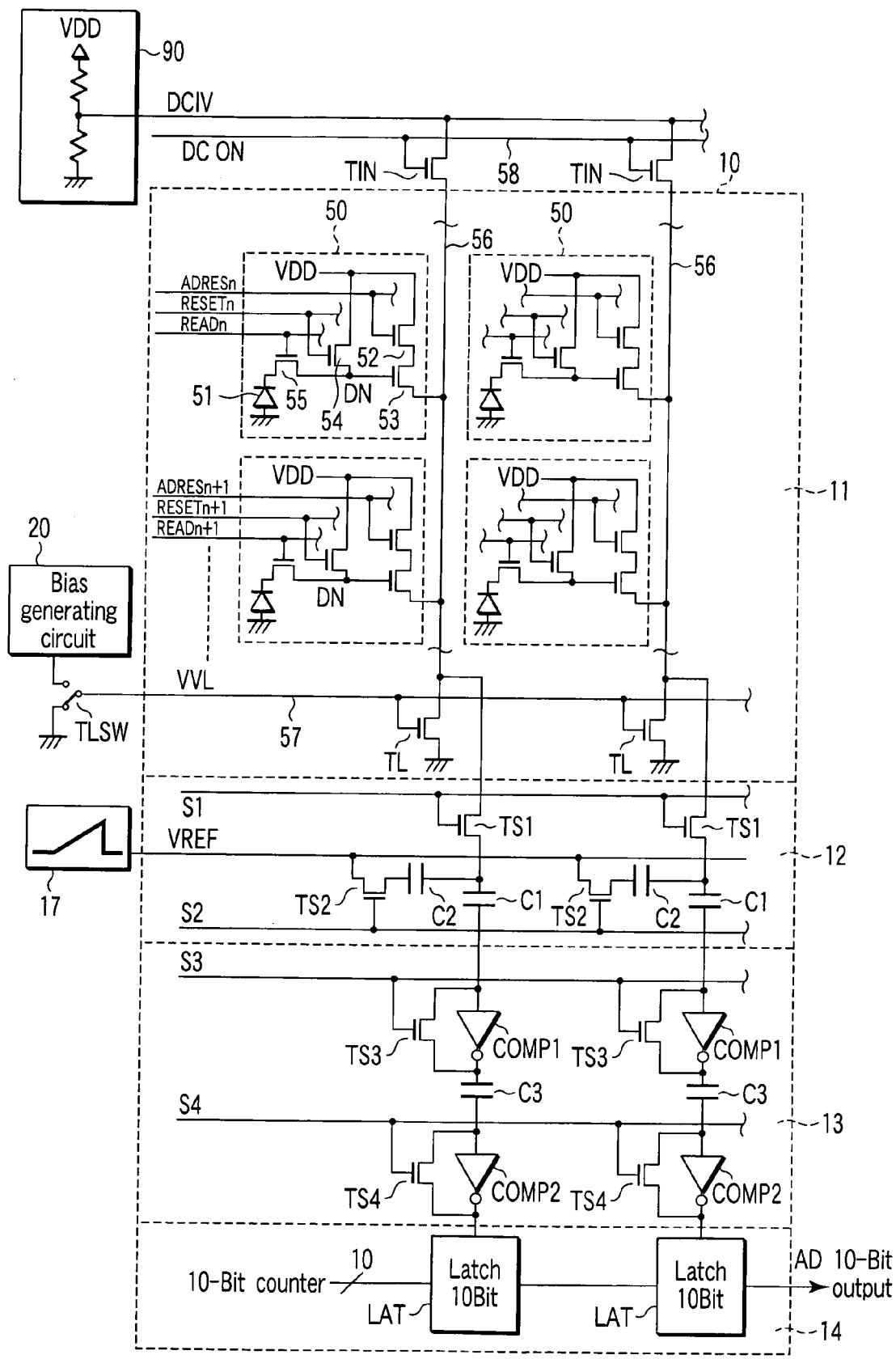
F I G. 10

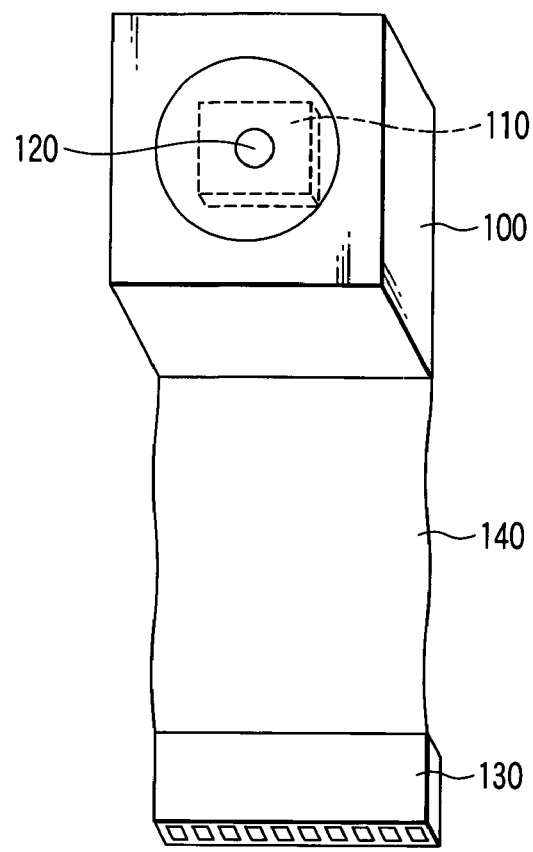
F I G. 12A
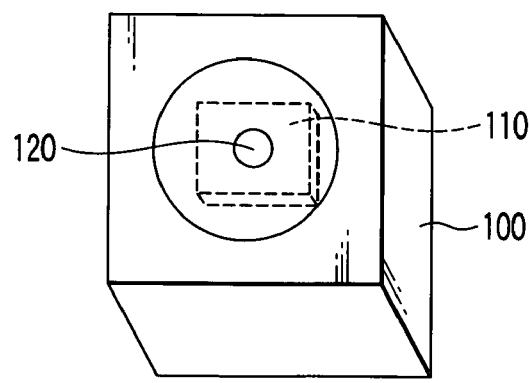
F I G. 12B

SOLID-STATE IMAGING APPARATUS

CROSS-REFERENCE TO RELATED APPLICATIONS

This application is based upon and claims the benefit of priority from prior Japanese Patent Application No. 2004-342432, filed Nov. 26, 2004, the entire contents of which are incorporated herein by reference.

BACKGROUND OF THE INVENTION

1. Field of the Invention

The present invention relates to a solid-state imaging apparatus, and, more particularly, to a two-dimensional image sensor including a signal processing circuit which reduces noises, and is used for a cellular telephone, a digital still camera, a video camera, a vehicle-mounted camera and the like.

2. Description of the Related Art

A CMOS image sensor which is a kind of two-dimensional image sensor has been disclosed in, for example, Jpn. Pat. Appln. KOKAI Publication No. 2000-287137 (SUGIKI), Jpn. Pat. Appln. KOKAI Publication No. 2004-15712 (NAKAMURA and KAWAHITO), and Jpn. Pat. Appln. KOKAI Publication No. 2000-261730 (NAKAMURA and SONE). According to one example of the CMOS image sensor, an analog-to-digital conversion (AD conversion) circuit is provided for each of a plurality of vertical lines in an imaging area, and the output of each AD-conversion circuit is sequentially selected to obtain digital video output.

In the CMOS image sensor disclosed in SUGIKI, each AD-conversion circuit has a voltage comparator section. Each of the voltage comparator sections includes an amplifier in a plurality of stages. Furthermore, a clamping circuit is provided in each amplifier. A plurality of pixel signals, which have been read from a plurality of horizontal lines in an imaging area, are converted in the above-described plural of AD-conversion circuits. The data after being subject to the AD conversion is held in each latch circuit, and is output from each latch circuit as data with a plurality of bits in the subsequent horizontal effective period.

In the CMOS image sensor, a number of transistors for switches are inserted on a signal path between the imaging area and the AD-conversion circuit. When threshold voltages of the transistors vary, the levels of the signals fluctuate for each vertical line when the states of the transistors are changed from ON to OFF. Then, noises with a fixed vertical-stripe pattern, that is, vertical-stripe noises are generated by variations in fluctuations of the signal levels.

Moreover, in readout operation for each horizontal line in an imaging area, the power-supply voltage fluctuates, and the waveform of the reference voltage for AD conversion fluctuates for each horizontal line when the states of the above transistors for switches are changed from ON to OFF. Accordingly, the signal levels fluctuate for each horizontal line, and horizontal-stripe noises are generated. The horizontal-stripe noises are generated at random because the noises are caused by fluctuations in the power-supply voltage. These vertical-stripe and horizontal-stripe noises cause deterioration in picture quality.

Furthermore, NAKAMURA and SONE has disclosed that an image signal without vertical-stripe noises can be obtained by a configuration in which a black reference section is provided in the end portion of the effective pixel area in the vertical direction, and, in a vertical blanking period, the output from the black reference section is accumulated to acquire a reference signal by calculating an average value, and to subtract the above-described reference signal from signals in an effective pixel area during each horizontal effective period.

BRIEF SUMMARY OF THE INVENTION

According to an aspect of the present invention, there is provided a solid-state imaging apparatus including: an imaging area including an effective pixel section and a light proof optical black section, wherein the optical black section includes a first optical black section arranged at one end of the imaging area in the horizontal direction, and a second optical black section arranged between the effective pixel section and the first optical black section, the effective pixel section includes a plurality of photoelectric transducers which are two-dimensionally arranged, and a plurality of detection sections which generate pixel signals by voltage conversion of signal charges, which are being subjected to photoelectric conversion in the photoelectric transducers, the first optical black section includes a plurality of photoelectric transducers which are two-dimensionally arranged, and a plurality of detection sections which generate pixel signals by voltage conversion of signal charges, which are being subjected to photoelectric conversion in the photoelectric transducers; an AD-conversion circuit to which pixel signals generated in the imaging area are supplied through a plurality of vertical signal lines, and which converts the pixel signals to digital signals; and a signal processing circuit which receives the digital signals obtained in the AD-conversion circuit, and outputs digital video signals, wherein the signal processing circuit adds or subtracts first digital signals to or from second digital signals, the first digital signals are generated in the first optical black section, and converted in the AD-conversion circuit, the second digital signals are generated in the effective pixel section, and converted in the AD-conversion circuit.

BRIEF DESCRIPTION OF THE SEVERAL VIEWS OF THE DRAWING

FIG. 1 is a block diagram showing a whole configuration for a CMOS image sensor according to a first embodiment of the present invention;

FIG. 9 is a block diagram showing a whole configuration for a CMOS image sensor according to a second embodiment of the present invention;

FIG. 10 shows circuit configurations for the sensor core section, the VREF generating circuit, the first bias generating circuit, and the second bias generating circuit, which are shown in FIG. 9;

FIGS. 12A and 12B are perspective views showing an external appearance of a CMOS image sensor module using the CMOS image sensor according to the above-described embodiments.

DETAILED DESCRIPTION OF THE INVENTION

Figure 2A:
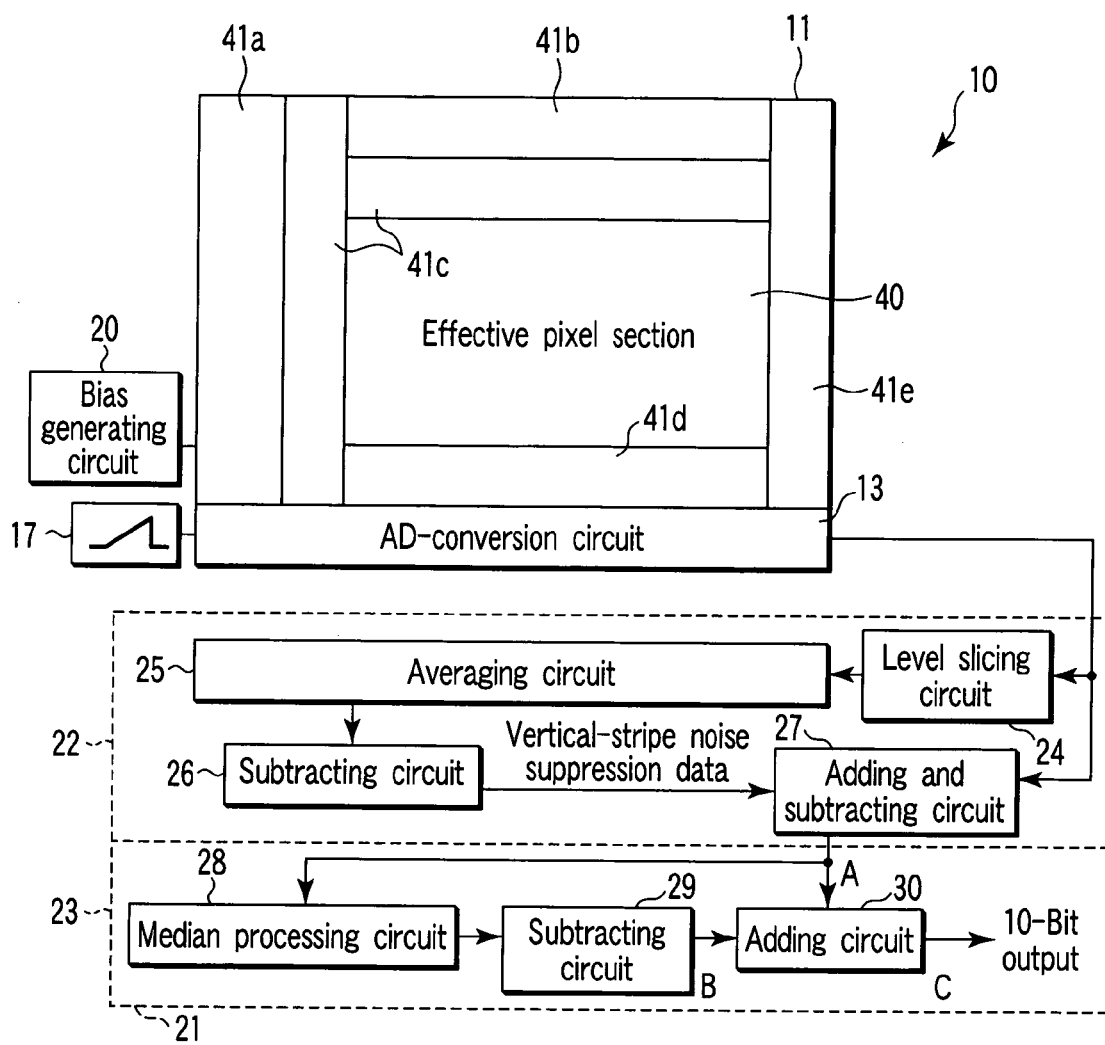
FIG. 2A is a view showing a layout of a sensor core section, and the configuration of the signal processing circuit in the CMOS image sensor shown in FIG. 1.

Hereinafter, embodiments according to the present invention will be explained with reference to the accompanying drawings. In the following explanation, components common to those in all the drawings will be denoted by the common reference numerals.

First Embodiment

FIG. 1 is a block diagram showing a whole configuration for a CMOS image sensor according to a first embodiment of the present invention. In the CMOS image sensor, various kinds of circuits are integrated on one semiconductor chip. The CMOS image sensor includes a sensor core section 10. The sensor core section 10 includes: a pixel section (imaging area) 11; a noise canceling circuit of a column type (CDS) 12; an AD-conversion circuit of a column type (ADC) 13; a latch circuit 14 which latches a signal after being subjected to digital conversion in the AD-conversion circuit 13; and a shift register (horizontal shift register) 15 which controls readout of a signal which have been latched in the latch circuit 14.

A plurality of pixel are two-dimensionally arranged in the imaging area 11, and, as described later, each pixel has a photoelectric transducer, a readout gate which reads the signal after being subject to photoelectric conversion, and a detection section which converts signal charges, which have been read out, to a voltage.

A timing signal generating circuit (TG) 16 which generates various kinds of control pulse signals used for control of readout operation of the signal from imaging area 11 and operation of the noise canceling circuit 12, a VREF generating circuit 17 which generates a reference signal VREF for comparison, the reference signal VREF is used in the AD-conversion circuit 13, a serial interface (I/F) circuit 18 as an interface for data DATA serially input from the outside for various kinds of control, and a command control circuit 19, which generates various kinds of control signals by decoding command data input through the serial I/F circuit 18, are provided on the semiconductor chip.

Furthermore, a first bias generating circuit 20 generating a first bias voltage VVL required in the imaging area 11, and a signal processing circuit 21, which outputs a digital video signal to the outside after suppression of vertical-stripe and horizontal-stripe noises in the signal read out from the latch circuit 14, are further provided on the semiconductor chip.

The VREF generation circuit 17 has a counter which counts a clock signal. The counter is started according to predetermined timing, and a voltage level is gradually changed from a low level to a high level according to the count values of the counter to generate, for example, a reference signal VREF with a triangular wave shape.

The AD-conversion circuit 13 and the signal processing circuit 21 may be integrated on the other semiconductor chip which the sensor core section 10 is not integrated.

FIG. 2A is a view showing a layout of the sensor core section 10, and the configuration of the signal processing circuit 21 in the CMOS image sensor shown in FIG. 1.

Main sections in the imaging area 11 are an effective pixel section 40, which is an area in which light enters into the photoelectric transducers for effective photoelectric conversion, and an optical black (OB) section which is a light proof area. The optical black section includes: an optical black section 41a, which is arranged in the imaging area 11 at the side on which readout in the direction of horizontal lines is started, and has the same pixel structure as that of the effective pixel section 40; a dummy optical black section 41b which is arranged at the upper end in the vertical direction in the imaging area 11, and is provided only with a detection section, but without a photoelectric transducer for a pixel; an optical black section 41c against blooming, the section 41c is arranged adjacent to the above-described optical black sections 41a and 41b; an optical black section 41d, which is arranged at the lower end in the vertical direction in the imaging area 11, and has the same pixel structure as that of the effective pixel section 40; and an optical black section 41e which is arranged in the imaging area 11 at the side on which readout in the horizontal line direction is completed. The optical black section 41a includes, for example, 36 pieces of pixels for each horizontal line.

The pixel structures for the effective pixel section 40, the optical black section 41a, the dummy optical black section 41b, and the optical black section 41c against blooming will be explained later.

A digital pixel signal which is obtained in the AD-conversion circuit 13, and is sequentially read out from the latch circuit 14 is input to the signal processing circuit 21. The signal processing circuit 21 includes a vertical-stripe-noise suppression circuit 22, and a horizontal-stripe-noise suppression circuit 23. In the signal processing circuit 21, a digital video signal is output after predetermined operation processing of a digital pixel signal and suppression of vertical-stripe noises and horizontal-stripe noises.

The vertical-stripe-noise suppression circuit 22 includes: a level slicing circuit 24; an adding and averaging circuit 25; a subtracting circuit 26; and an adding and subtracting circuit 27. In the vertical-stripe-noise suppression circuit 22, when the output signals for a plurality of lines, the output signals have been read out from the optical black section 41b which is arranged at the end of the imaging area 11 in the vertical direction, are larger than a first reference level, or are smaller than a second reference level, the readout signals are sliced at each level, and averaging of the signals on a plurality of lines is performed in the vertical direction to add or subtract the performed result to the output signals of effective pixels in the effective pixel section 40.

The horizontal-stripe-noise suppression circuit 23 includes: a median processing circuit 28; a subtracting circuit 29; and an adding circuit 30. In the horizontal-stripe-noise suppression circuit 23, the output signals from the optical black section 41a which is arranged in the imaging area 11 at the side on which readout in the direction of horizontal lines is started are rearranged in the decreasing order of the signal levels, and the signals of pixels in the vicinity of the approximately center level of the rearranged signals, or the average value of the signals of a plurality of pixels in the vicinity of the center level are added to the signals of the effective pixels in the effective pixel section 40.

Figure 3:
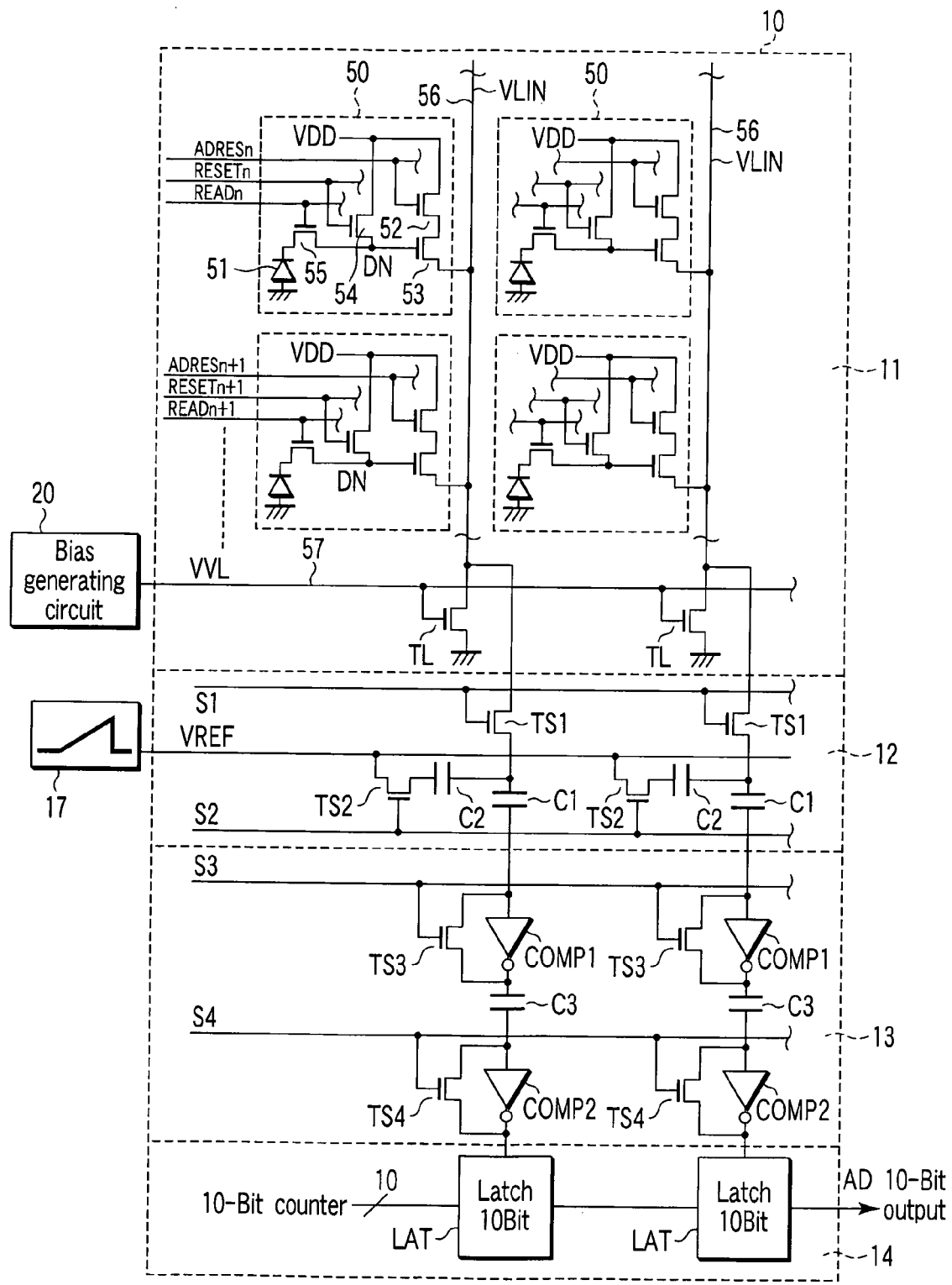
FIG. 3 is a view showing circuit configurations of a sensor core section, a VREF generating circuit, and a first bias generating circuit, which are shown in FIG. 2A.

FIG. 3 is a view showing circuit configurations of the sensor core section 10, the VREF generating circuit 17, and the first bias generating circuit 20, which are shown in FIG. 2A.

A plurality of pixels 50 which are two-dimensionally arranged in the horizontal and vertical directions are provided in the imaging area 11. Each pixel 50 in the effective pixel section 40 includes: a photoelectric conversion element, for example, a photodiode 51, and four transistors 52 through 55. The transistor 52 is a transistor for line selection, the transistor 53 is a transistor for amplification, the transistor 54 is a transistor for reset, and the transistor 55 is a transistor for signal readout.

In each pixel 50, the anode of the photodiode 51 is connected to the supply node of the ground voltage GND, and the cathode is connected to the supply node for the voltage VDD of the direct-current power supply through the transistor 55 and the transistor 54. In the transistor 53, the gate electrode is connected to a common connection node between the above-described transistors 54 and 55, one of the source or the drain of the transistors 53 is connected to the supply node for VDD through the transistor 52 for line selection, and the other is connected to a corresponding one among a plurality of vertical signal lines 56.

A plurality of load transistors TL for source follower is arranged in the direction of the horizontal line, bordering the imaging area 11. The plurality of load transistors TL are connected between one end of a plurality of vertical signal lines 56 and the supply node of the ground voltage, and the gate electrodes are connected to a first gate control line 57 in common. The first bias generating circuit 20 generates the first bias voltage VVL, and the voltage VVL is supplied to the gate control line 57.

A transistor TS1 for signal transmission by which a signal VLIN on one corresponding vertical signal line 56 among a plurality of the vertical signal lines 56 is transmitted to the AD-conversion circuit 13, a transistor TS2 for VREF transmission by which a reference signal VREF for AD conversion is supplied to the AD-conversion circuit 13, and capacitors C1 and C2 for noise cancellation are arranged for each vertical signal line 56, bordering areas in which one corresponding load transistor TL among the above plurality of load transistors TL is formed. Furthermore, bordering an area in which the transistor TS1 and TS2, and the capacitor C1 and C2 are formed, voltage comparators COMP1 and COMP2 in two stages are arranged for each of the vertical signal lines 56. Each of the voltage comparators COMP1 and COMP2 in two stages compares the signal VLIN on each signal line 56, the signal VLIN is transmitted through the transistor TS1, with the reference voltage VREF, and the output of the voltage comparator COMP2, in which both of the voltages are in agreement with each other, is activated. Here, the source and the drain of the transistor-TS3 for clamping are inserted between the input/output nodes of the voltage comparator COMP1. A pulse signal S3 is supplied to the gate electrode of the transistor TS3. The capacitor C3 is connected in between the output node of the voltage comparator COMP1 and the input node of the voltage comparator COMP2. Here, the source and the drain of the transistor TS4 for clamping are inserted between the input/output nodes of the voltage comparator COMP2. A pulse signal S4 is supplied to the gate electrode of the transistor TS4.

A latch circuit LAT is provided for each vertical signal line 56. The plurality of these latch circuits LATs forms a latch circuit 14 in FIG. 1. A digital signal corresponding to the reference signal VREF, for example, a 10-bit digital signal is supplied in parallel to the above plurality of latch circuits LATs. Then, among the plurality of latch circuits LATs, a latch circuit LAT corresponding to a voltage comparator COMP2 in which the output is activated latches a digital signal corresponding to the reference signal VREF. Thereby, the readout signals VLINs on the plurality of vertical signal lines 56 are converted to digital signals. Digital signals latched in the plurality of latch circuits LATs are sequentially transmitted through the plurality of latch circuit LATs under control of the shift register 15 shown in FIG. 1, and are read out as 10-bit AD-conversion output, that is, as DOUT0 through DOUT9 in FIG. 1 from a latch circuit located at the end.

Figure 4:
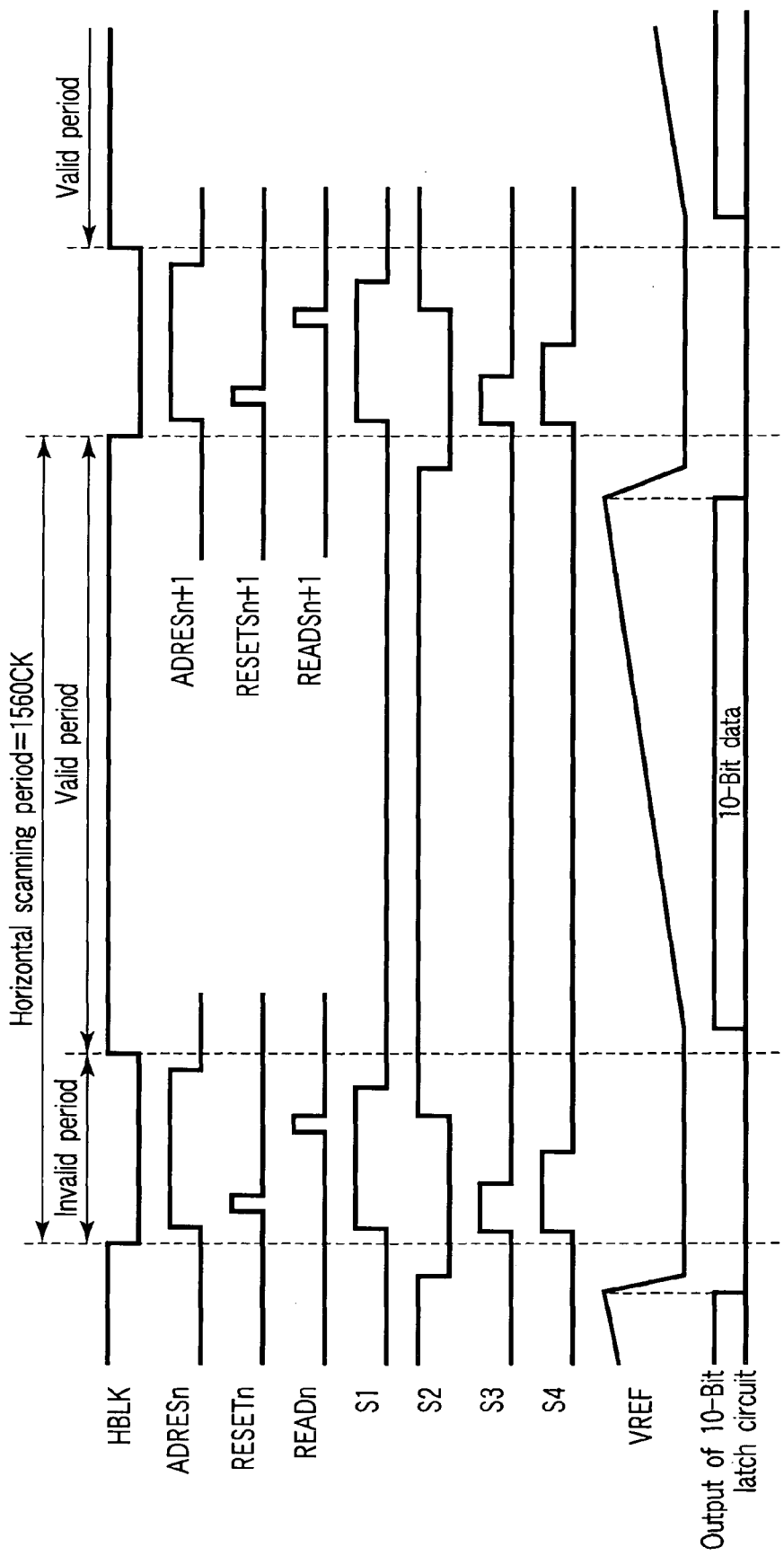
FIG. 4 shows signal waveforms for a principal portion of the sensor core section shown in FIG. 3.

FIG. 4 shows waveforms of operation timing for the sensor core section 10 shown in FIG. 3.

In order to read signals on n pieces of vertical lines in the imaging area 11 out, a pulse signal ADRESn is activated during a invalid period within a horizontal scanning period (usually, a period of 1560 clock signals) indicated in a pulse signal HBLK, a source follower circuit including the transistor 53 and the load transistor TL is operated by putting the transistor 52 in a pixel 50 into an ON state, and signal charges after being subjected to photoelectric conversion in the photodiode 51 are read out to a plurality of vertical signal lines 56 for a certain period.

In order to remove invalid signals caused by dark currents and the like in a detection section DN of each pixel 50 in FIG. 3 before operation for readout of the above signal charges, a pulse signal RESEn is activated during the horizontal invalid period to put the transistor 54 into an ON state, and the detection section DN is reset to a VDD level. Thereby, a signal at the reset level is output as signal VLIN to each of the vertical signal lines 56. Moreover, a reference level for AD conversion in the voltage converters COMP1 and COMP2 is set during the horizontal invalid period by putting the transistor TS1 into an ON state according to a control pulse signal S1, by putting the transistor TS3 inserted between the input and output nodes of the comparator COMP1 into an ON state according to a control pulse signal S3, and by putting the transistor TS4 inserted between the input and output nodes of the comparator COMP2 into an ON state according to a control pulse signal S4.

Subsequently, the reset level of the vertical signal line 56 is accumulated in the capacitor C1 after the transistor TS3 is put into an OFF state. Then, the transistor 55 for signal readout in the pixel 50 is put into an ON state according to the pulse signal READn, and signal charges accumulated in the photodiode 51 are read out onto the detection section DN. Thereby, signals obtained by superimposing the signal levels on the reset level are read out onto the vertical signal lines 56. At this time, the signal already read out onto the vertical signal line 56 is accumulated in the capacitor C2 by putting the transistor TS1 into an ON state according to the control pulse signal S1, by putting the transistor TS3 into an OFF state according to the control pulse signal S3, by putting the transistor TS4 into an OFF state according to the control pulse signal S4, and by putting the transistor TS2 into an ON state according to the control pulse signal S2.

Thereafter, the transistor TS1 is put into an OFF state, and the signal is held in the capacitor C2. Since the input node of the comparator COMP1 is at high impedance this time, the reset level remains held in the capacitor C1.

Subsequently, the reference signal VREF is gradually changed from a low-level to a high level in an effective period of the horizontal scanning period, the reference signal VREF is input to the comparator COMP1 through the combined capacitor of the capacitors C1 and C2, and the signals read out from pixels and the reference signal VREF are compared in the comparators COMP1 and COMP2. Since the polarity of the reset level accumulated in the capacitor C1 is opposite to that of the reset level accumulated in the capacitor C2 in this case, the reset level is canceled, and the signal component of the reference signal VREF substantially supplied through the capacitor C2 is compared with the readout signal from the pixel. Then, the outputs of the comparators COMP2 in which the voltages of the both compared signals are in agreement with each other, among a plurality of comparators COMP2, are activated, and digital signals corresponding to the reference signal VREF are latched in the latch circuits LAT to which the activated outputs are input. Thereby, AD conversion of signals which are read out onto a plurality of vertical signal lines 56 is performed. Noise-reducing operation by which the reset level is removed as described above is called "correlated double sampling (CDS)". Data after being subjected to AD conversion is held in each of the latch circuits LATs, and is output as 10-bit data DOUT0 through DOUT9 from the latch circuit LAT during the subsequent horizontal effective period. In the present embodiment, 10-bit AD-conversion levels of 0 level through 1023 level are generated, using a 10-bit counter.

In order to perform operations in the AD-conversion circuit 13 in a more accurate manner, processing by which the direct-current voltage levels of the input and output nodes of the comparator COMP1 are made equal to each other, and processing by which the direct-current voltage levels of the input and output nodes of the comparator COMP2 are made equal to each other are performed before the above-described AD-conversion operation is performed. That is, so-called clamping processing by which the transistor TS3 inserted between the input and the output nodes of the comparator COMP1 and the transistor TS4 inserted between the input and the output nodes of the comparator COMP2 are put into an ON state once, is performed to reduce the variations in the input offset voltages. At this clamping, parasitic capacitance existing between the gate electrode of the transistor TS3 and the input and output nodes of the comparator COMP1 cause a difference between the threshold voltage and the clamping voltage of the comparator COMP1. The above difference is influenced by manufacturing variations of the transistor TS3, and, consequentially, there are caused variations among the direct-current voltage levels of the output signals of a plurality of the comparator COMP1. Consequently, the above variations appear as variations among channels of digital output values.

Then, in the same manner as the case of the solid-state image sensor disclosed in the above-described SUGIKI, voltages are compared, using the comparators COMP1 and COMP2 in two stages, the comparators are provided with the transistor for clamping. Thereby, a configuration in which variations in the direct-current voltage levels among signals read out from a plurality of pixels in the direction of the same horizontal lines are not caused can be realized to improve picture quality. In this case, it is preferable to set OFF-timing of the control pulse signals S3 and S4 in such a way that timing by which the transistor TS4 inserted between the input and output nodes of the post-stage comparator COMP2 is put into an OFF state lags behind timing by which the transistor TS3 inserted between the input and output nodes of the pre-stage comparator COMP1 is put into an OFF state. In FIG. 4, the control pulse signals S3 and S4 are put into a high level state, and the transistors TS3 and TS4 are put into an ON state at the same timing. However, it may essentially adopt a configuration in which the timing, at which the post-stage transistor TS4 is put into an OFF state, lags behind one at which the pre-stage transistor TS3 is put into an OFF state. Accordingly, the timing at which the post-stage transistor TS4 is put into an ON state, may lag behind one at which the pre-stage transistor TS3 is put into an OFF state. Here, influences of variations in the characteristics of the post-stage transistors TS4 causes variations in the AD-conversion characteristics among channels. However, since signal are increased by a factor of A1 (A1 denoting an amplification factor of the comparator COMP1) in the pre-stage comparator COMP1, the influence caused by variations in the characteristics of the transistor TS4 is reduced by a factor of 1/Aa from the view point of the post-stage comparator COMP2. Accordingly, the above variations are substantially reduced to zero, compared with those of signal components.

However, the signal levels fluctuate on each line when the transistor TS1 is put into an OFF state, based on variations in threshold voltages and the like of the transistors TS1 and TS3. There is a possibility that vertical-stripe noises are generated by variations in the above fluctuations. Moreover, the signal levels fluctuate on each horizontal line, because the power-supply voltage fluctuates when the transistor TS1 or TS3 is put into an OFF state, or the level of the reference signal VREF for AD conversion fluctuates on each horizontal line. There is a possibility that horizontal-stripe noises are generated by variations in the above fluctuations. Since the horizontal-stripe noises are caused by fluctuations in the power-supply voltages, the noises are generated at random. The above vertical-stripe and horizontal-stripe noises cause deterioration in picture quality. In the present embodiment, measures for the vertical and horizontal-stripe noises are taken as follows.

That is, the analog signal converted in the photodiode 51 is converted to a 10-bit digital signal in the column-type AD-conversion circuit 13 of the sensor core section 10 shown in FIG. 3. In this case, generation of the reference signal VREF is controlled in such a way that the signal readout from the optical black section 41a which is arranged in the imaging area 11 at the side on which readout in the direction of horizontal lines is started becomes 32 LSB signal after AD conversion, that is, in such a way that the signal VREF becomes a 32nd level (OB level=32 LSB) of a signal, assuming that the least significant bit LSB, among 0 LSB through 1023 LSB of a digital signal expressed in 10 bits, is a starting point. A 10-bit digital output signal after being subjected to AD conversion is input to the signal processing circuit 21 shown in FIG. 2A.

The signal input to the signal processing circuit 21 is input to the adding and averaging circuit 25 through the level slicing circuit 24 for vertical-stripe noise suppression. In the circuit 25, a plurality of lines, for example, signals of 64 lines are added for averaging processing. According to an experiment, practicable signals without increase in random noises were obtained by averaging for equal to or more than 64 lines of signals. According to the above experiment, small number of lines as 64 lines can be realized without generating suppression mistakes by removing white stripes and large random noises, using the level slicing circuit 24. The small number of lines is effective, especially, when a sensor temperature is high, or when a sensor GAIN is high (when a VREF amplitude is small). The averaged signals are input to the subtracting circuit 26, in which suppression levels for white vertical-stripe noises and black vertical-stripe noises are extracted by subtracting OB level from 32 LSB.

The extracted suppression levels for white vertical-stripe noises and black vertical-stripe noises are input to the adding and subtracting circuit 27. When the input signal into the signal processing circuit 21 is an effective pixel signal read out from the effective pixel section 40, the suppression level for white vertical-stripe noises is subtracted from the effective pixel signal, and the suppression level for black vertical-stripe noises is added to the effective pixel signal. The vertical-stripe noise suppression is performed, based on the above adding and subtracting, and, moreover, horizontal shading is also improved.

Figure 2B:
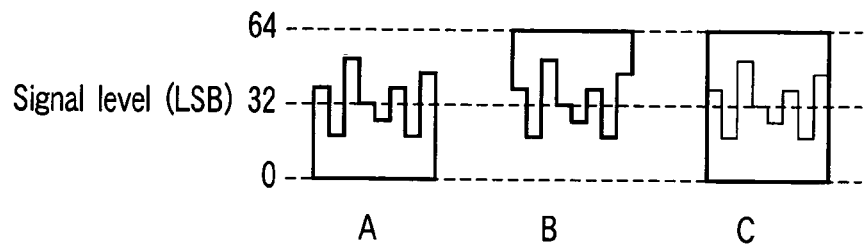
FIG. 2B is a view showing signal waveforms for a principal portion in a horizontal-stripe noise suppression circuit shown in FIG. 2A.

One example of the signal waveform in the horizontal-stripe noise suppression is shown with letters A, B, and C in FIG. 2B. The signal A shows a signal for each line in the vertical direction. The signal A has been subjected to vertical-stripe noise suppression. In this signal A, portions which fluctuate, crossing the 32 LSB level, are generated as horizontal-stripe noises. This signal presents fluctuation of the same level for both the optical black section 41a and the effective pixel section 40 existing at the same horizontal line. Therefore, a differential signal (solid line) like a signal B is obtained by detecting level changes of the optical black section 41a and subtracting the changes from 64 LSB. By adding this differential signal to the signal of effective pixels, the level changes are improved as shown in a signal C, and the OB level can be set at 64 LSB. By this adding, 1023 LSB of the saturation level can be prevented from decreasing. In the present embodiment, the OB level of the optical black section 41a is changed from 32 LSB to 64 LSB, and is output as a sensor output. However, setting of the OB level can be freely changed.

In the signal processing circuit 21 shown in FIG. 2A, the output signal A of the adding and subtracting circuit 27 after being subjected to vertical-stripe noise suppression is input to the median processing circuit 28 for horizontal-stripe noise suppression. That is, signals of 36 pixels are read out from the optical black section 41a which is arranged at the side on which readout of the horizontal line is started, and are subjected to median processing for reducing or removing white stripe noises or random noises. Accordingly, only level changes in the optical black section 41a are detected. Averaged signal SigOB extracted through the above median processing is input to the subtracting circuit 29, and SigOB is subtracted from 64 LSB. The output signal of the subtracting circuit 29 is input to the adding circuit 30. In the adding circuit 30, the output signal is added to that of effective pixels on the same horizontal line as the horizontal line which has been subjected to the median processing. Vertical shading in the vertical direction can be also improved according to this operation.

Figure 5:
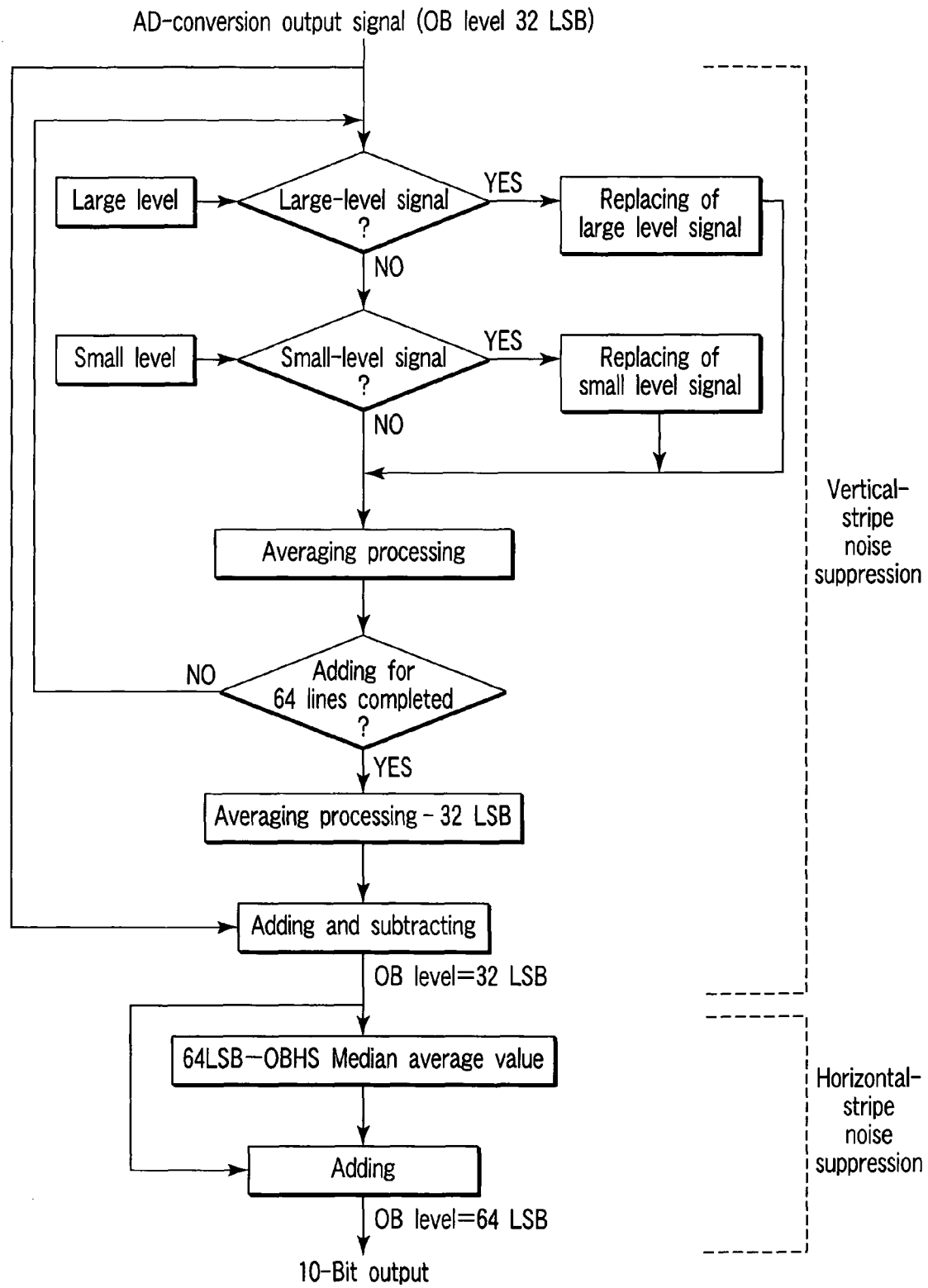
FIG. 5 is a flow chart showing an operation example of the signal processing circuit shown in FIG. 2A.

FIG. 5 is a flow chart showing an operation example of the signal processing circuit 21 shown in FIG. 2A. In order to suppress the vertical-stripe noises, white stripe noises and large random noises are removed from an AD-conversion output signal, using the level slicing circuit 24. In this case, a large level (a first reference level), and a small level (a second reference level) are set beforehand for slicing in the level slicing circuit 24. In the first place, an AD-conversion output signal is compared with the large level. When the AD-conversion output signal is larger than the large level, the signal is sliced at the large level, and the signal is replaced with a large level signal. When the AD-conversion output signal is not larger than the large level, the AD-conversion output signal is compared with the small level. When the AD-conversion output signal is smaller than the small level, the signal is sliced at the small level, and the signal is replaced with a small level signal. According to the above processing, a steady vertical-stripe signal level can be extracted.

Subsequently, the signal which has been previously replaced with the large level signal or the small level signal is input to the adding and averaging circuit 25, and is added to a signal which has been input before to perform averaging processing. Then, when it is judged that averaging processing for signals of 64 lines has been completed, 32 LSB is subtracted from the result of the averaging processing in the subtracting circuit 26. Thereby, vertical-stripe noise suppression data with a sign is obtained.

Subsequently, adding and subtracting of the above vertical-stripe noise suppression data and the effective pixel signal in the vertical direction is performed in the adding and subtracting circuit 27. In the above processing, vertical-stripe noise data is subtracted from the effective pixel signal in the case of the white vertical-stripe noises, and vertical-stripe noise data is added to the effective pixel signal in the case of the black vertical-stripe noises.

A signal which is subjected to averaging in the adding and averaging circuit 25 is either a readout signal from the dummy optical black section 41b, which is arranged at the upper end of the imaging area 11 in the vertical direction, or a signal of the AD-conversion circuit 13 under a state in which a readout signal is not supplied from the imaging area 11. Only a signal from the AD-conversion circuit 13 is obtained by a configuration in which the transistor TS1 is controlled to be in an OFF state, and the transistor TS2 is controlled to be in a ON state. According to an experiment result, it turned out that almost all the vertical-stripe noises were generated in the AD-conversion circuit 13. Furthermore, when a signal from the effective pixel section 40 is used, random noises generated in the effective pixel section 40 are mixed to increase noises in a signal after being subjected to averaging. According to an experiment, it turned out that a configuration in which a readout signal from the imaging area 11 is not used, and only a signal from the AD-conversion circuit 13 is utilized is the most effective method. In an experiment, practicable vertical-stripe noise suppression without deterioration caused by noises can be realized by averaging for signals of 64 lines.

Subsequently, in order to perform horizontal-stripe noise suppression, signals of 36 pixels from the optical black section 41a which is arranged in the imaging area 11 at the side on which readout in the direction of horizontal lines is started are rearranged in the decreasing order of the signal levels, and median processing by which a central value is extracted is executed. In order to improve a signal-to-noise ratio, signals of 2 pixels through 32 pixels with an intermediate level are selected, and an average value of the levels of the pixels may be adopted in order to extract the center value. According to the above median averaging, white stripe noises and large random noises generated in the optical black section 41a are removed to obtain horizontal-stripe-noise suppression data with less noises. Subsequently, the horizontal-stripe-noise suppression data is subtracted from 64 LSB, and, thereafter, the horizontal-stripe noises are suppressed by adding the signal obtained by the above subtracting to the signals of effective pixels on the same horizontal line. In this case, data on the line on which white stripe noises are generated is inversely suppressed to generate black stripe noises unless the white stripe noises are not removed beforehand. According to an experiment, practicable results of the horizontal-stripe noise suppression were obtained by the median averaging for signals of 32 pixels or more. Moreover, instead of using the median averaging data, data, which is obtained by extracting and removing signal data for four pixels in a large-level signal and by averaging signals for remaining 32 pixels, may be used for removal of the white stripe noises.

As described above, in the signal processing circuit 21 shown in FIG. 2A, vertical-stripe noises can be removed from a signal including vertical-stripe noises and horizontal shadings, and the horizontal shadings can be suppressed by using the readout signal from the dummy optical black section 41b, which is arranged at the upper end of the imaging area 11 in the vertical direction, or by operating only the AD-conversion circuit 13.

Moreover, horizontal-stripe noises can be reduced by generating an average value through averaging the signal levels of signals readout from the optical black section 41a which is arranged in the imaging area 11 at the side on which readout in the direction of horizontal lines is started, by subtracting the average value from 64 LSB, and by adding the subtracted result to an effective pixel signal. Furthermore, an AD-conversion signal of full bits, for which the OB level is set at 64 LSB, is obtained. But, when the average value is simply added and subtracted to and from the effective pixel signal, the AD-conversion signal of a full bit cannot be output at subtracting, and the level of a saturation signal is decreased by the subtracted amount to generate horizontal-stripe noises in the saturation-level area.

Since there is no necessity of reading signals from the optical black section 41c in the horizontal and vertical reading periods, the reading operating from the optical black section 41c can be jumped, and the operating speed can be enhanced.

Figure 6:
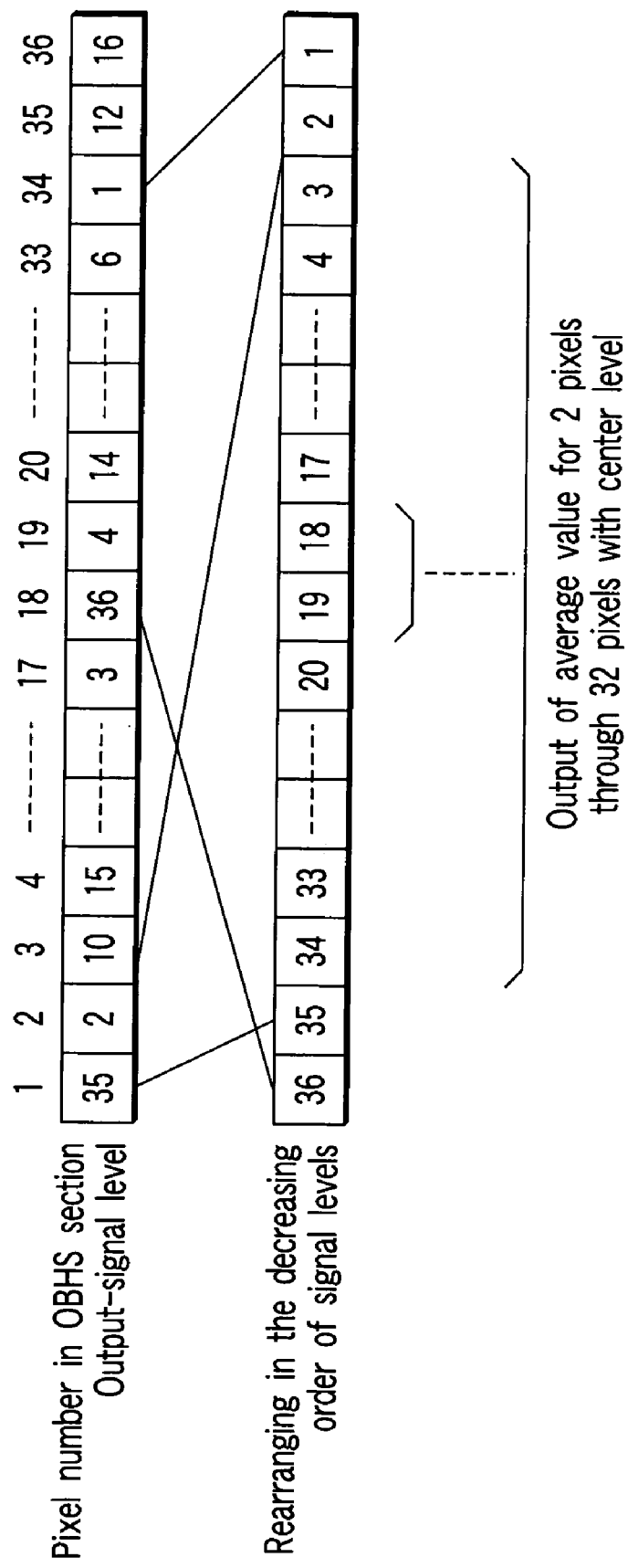
FIG. 6 is a view showing one example of a median averaging method in a median processing circuit shown in FIG. 5.

FIG. 6 is a view showing one example of the median averaging method in the median processing circuit shown in FIG. 5. AD-conversion signals are output from the AD-conversion circuit 13 in the order of pixels readout from the optical black section 41a. The level of the above signals fluctuates according to random noises, white stripe noises, and the like. These signals are rearranged in the decreasing or increasing order, and a signal level of a pixel with an approximately center level is extracted according to the median processing. At this time, in order to reduce the number of pixels in the optical black section 41a, and to obtain a signal with a good signal-to-noise ratio, signals of 2 pixels through 32 pixels with an intermediate level are selected to adopt an average value of the levels of the pixels, as explained above. The number of pixels adopting the average value, and the extracting position may be freely selected, considering the generation frequency of white stripe noises, leaking-in of signals, and the like.

As described above, noises with a fixed vertical-stripe pattern (vertical stripe noises), and noises with a horizontal-stripe pattern (horizontal stripe noises), which are generated at random, can be reduced according to the CMOS image sensor according to the first embodiment. Moreover, horizontal shadings and vertical shadings can be improved. Furthermore, color reproducibility can be improved because a black level (OB level) can be set at a predetermined level.

With regard to the vertical-stripe noise suppression, large random noises can be removed in the level slicing circuit 24, and, moreover, vertical-stripe noise suppression data with a good signal-to-noise ratio is obtained by averaging of only a signal from the AD-conversion circuit 13. With regard to the horizontal-stripe noise, the number of OB pixels can be reduced and horizontal-stripe noise suppression data with a good signal-noise ratio can be obtained, because suppression mistake caused by white-stripe noises can be prevented, and large random noises can be removed by median averaging horizontal OB pixels. Moreover, since the optical black section 41c against blooming is provided, vertical-stripe noise suppression and horizontal-stripe noise suppression that do not malfunction reacting to strong light can be also realized.

Accordingly, a high-quality video signal can be output by providing a small-scale signal processing circuit 21 for the CMOS image sensor of a digital output type.

FIGS. 7A to 7D are views showing sectional structures of a pixel provided respectively in the optical black section 41a, the optical black section 41c against blooming, the effective pixel section 40, and the dummy optical black section 41b shown in FIG. 2, together with the potential. For the sake of simplicity, the transistor for reset, that is, a component corresponding to the transistor 54 in FIG. 3, is eliminated in these drawings.

Figure 7A:
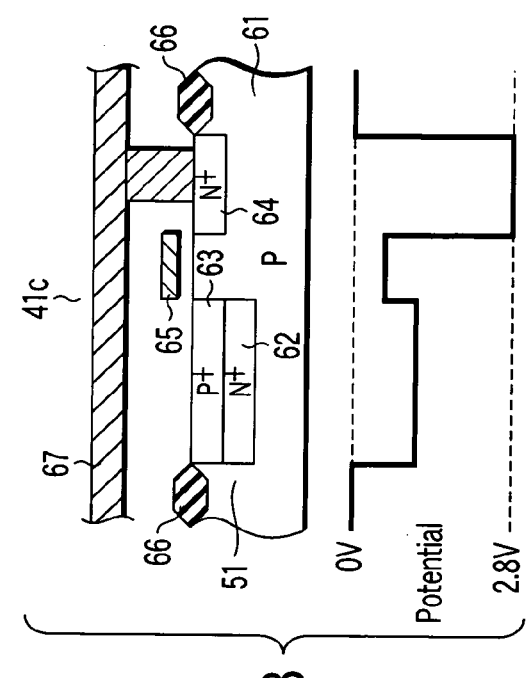
FIGS. 7A to 7D are views showing a sectional structure of various kinds of pixels shown in FIG. 2, together with the potential.
Figure 7B:
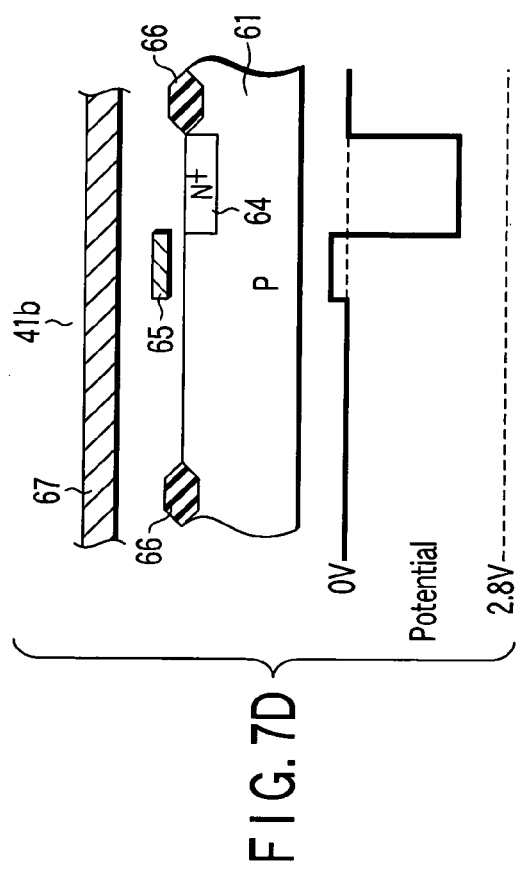
Figure 7C:
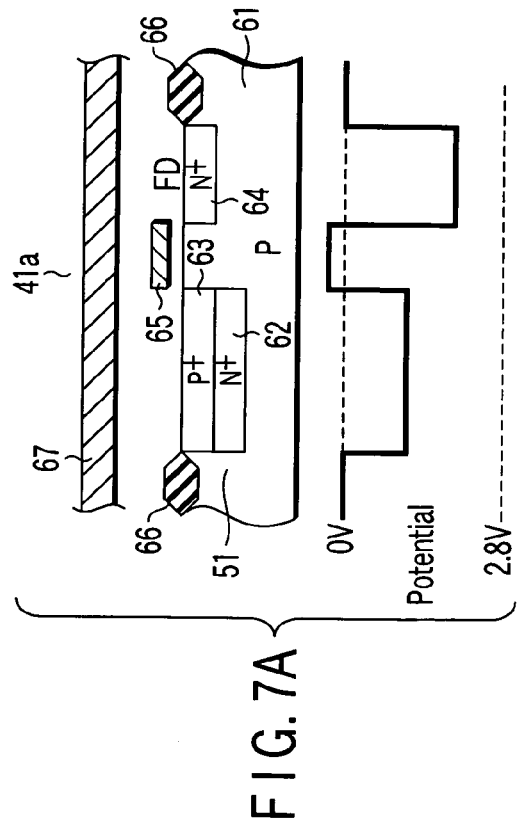

In the pixel of the effective pixel section 40 shown in FIG. 7C, the N+ layer 62 of the photodiode 51 is formed in a P-type semiconductor substrate 61. In order to reduce a surface leakage current, a P+ layer 63 is formed on the surface area of the N+ layer 62. An N+ layer 64 is formed apart from the above N+ layer 62 in the semiconductor substrate 61. The N+ layer 64 is equivalent to the detection section DN in FIG. 3. Moreover, a readout gate 65 corresponding to the transistor 55 in FIG. 3 is formed on the substrate between the above-described N+ layers 62 and 64. The pixels are separated by field isolation regions 66, and the top portions of the areas, other than the formation area of the photodiode 51 are covered with light proof films 67 such as aluminum in such a way that light does not enter into the areas.

The pixel of the optical black section 41a shown in FIG. 7A has almost similar structure to that of the pixel of the effective pixel section 40. The only difference is that the top portion of the formation area of the photodiode 51 is covered with the light proof film 67, and light does not enter into the formation area of the photodiode 51 in the section 41a. A dark voltage equivalent to that of the photodiode 51 in the effective pixel section 40 is generated in the photodiode 51 of the optical black section 41a. Thereby, boosting of the dark voltage of the effective pixel section 40 can be suppressed by the horizontal-stripe noise suppression.

The optical black section 41c against blooming shown in FIG. 7B is provided to reduce the amount of signal charges which overflow from the photodiode 51, and diffuse to the optical black section, when strong light enters into the effective pixel, for example, when a highly bright object is photographed. The pixel of the optical black section 41c has an almost same structure to that of the effective pixel section 40. The only difference is that the N+ layer 64 which is the detection section DN of the pixel is in contact with the light proof film 67 to which a power-supply voltage VDD, for example, of 2.8V is supplied. In addition, the potential is in a deep state on the substrate under the readout gate 65 of the photodiode 51 by being subjected to channel implantation and the like. Thereby, the signal charges flown into the photodiode 51 can be discharged to the detection section DN (drain). Since the pixel in the optical black section 41c has the above-described structure (referred to as "a charge-exhaust-pixel-structure" hereinafter), the amount of signal charges which flow out to the optical black section can be reduced. Accordingly, a configuration in which signal charges are almost prevented from flowing into the optical black section even when the sun light directly enters into the section with a lens aperture of F2.8 and with a number of 20 pixels or more can be realized. Moreover, the number of pixels could be reduced by about ½ in comparison with that of a usual optical black structure.

Figure 7D:
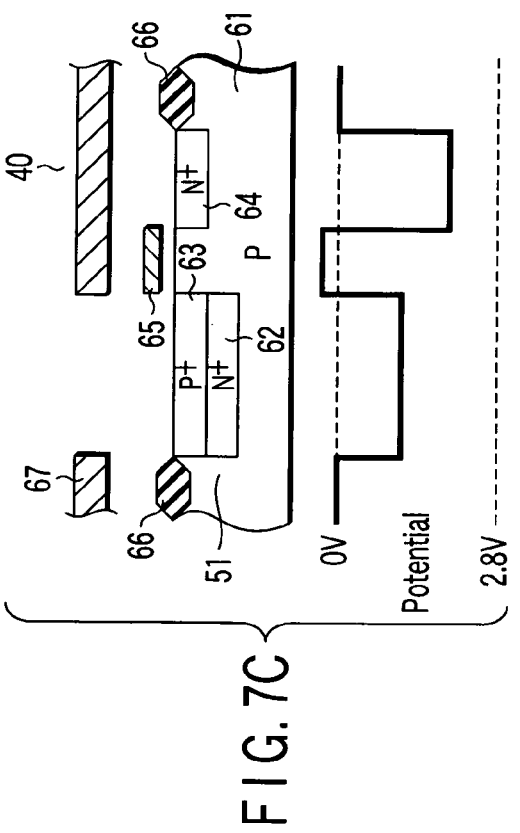

Since readout signals from the photodiode 51 are not required in the case of the vertical-stripe noise suppression as described above, the photo diode 51 is not formed in the pixel of the dummy optical black section 41b shown in FIG. 7D. Only the N+ layer 64 which is a detection section DN is formed on the substrate 61. Accordingly, neither signals nor dark voltages are generated.

Figure 8A:
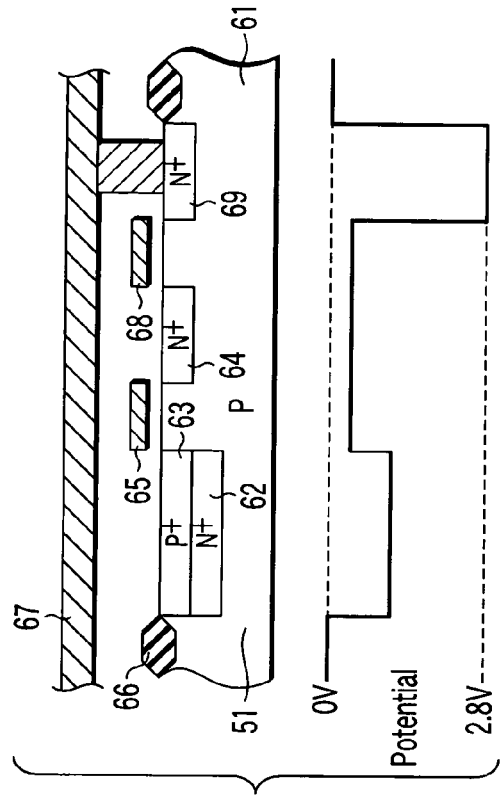
FIGS. 8A to 8C are views showing variation examples of the sectional structure of pixels in the optical black section against blooming shown in FIG. 7B, together with the potential.
Figure 8B:
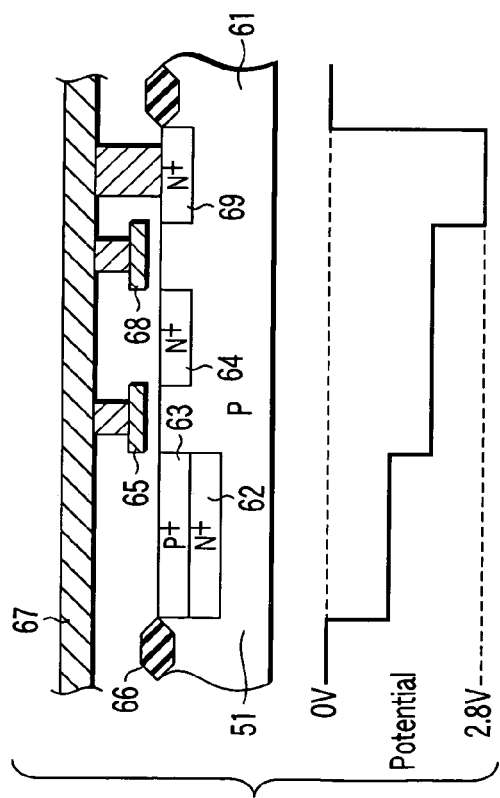
Figure 8C:
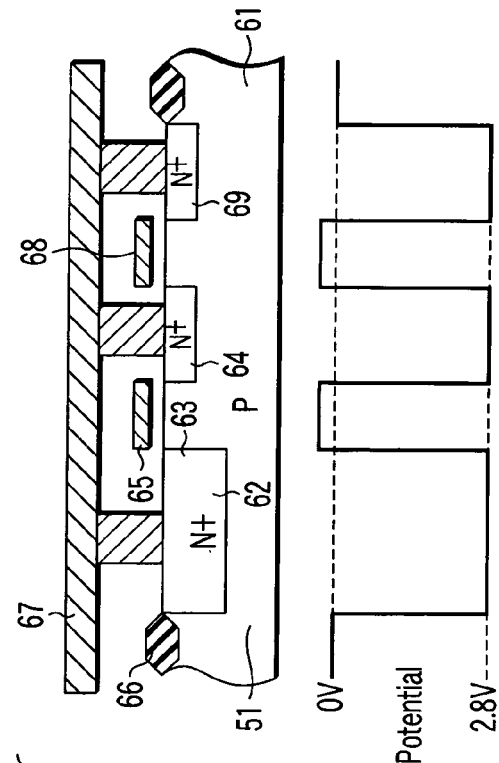

Each of FIG. 8A, FIG. 8B, and FIG. 8C shows a sectional structure of a variation example of the pixel in the optical black section 41c shown in FIG. 7B, together with the potential. Each of the pixel of FIG. 8A, FIG. 8B, and FIG. 8C has the charge-exhaust-pixel-structure. In the pixel shown in FIG. 8A, a reset gate 68 corresponding to the transistor 54 in FIG. 3, and an N+ layer 69 which is the drain of the transistor 54 are shown. And, the readout gate 65, the reset gate 68, and, the N+ layer 69 are in contact with the light proof film 67, together, and a power-supply voltage VDD of 2.8V is supplied to them. Thereby, the signal charges overflowing from the effective pixel section 40 are flown and are absorbed into the N+ layer 69 through the photodiode 51 and the detection section DN (N+ layer 64), because the portions in the substrate under the readout gate 65 and the reset gate 68 are in a deeper-potential state, and are in an ON state.

The pixel shown in FIG. 8B is different from that of FIG. 8A, that is, the readout gate 65 and the reset gate 68 are not in contact with the light proof film 67. But, the channel area under the readout gate 65 and the reset gate 68 is depressed, and the potential of the substrate thereunder is in a deeper state. That is, signal charges overflowing from the effective pixel section 40 are also absorbed into the N+ layer 69 in a similar manner to those of FIG. 8A in this case, because the readout gate 65 and the reset gate 68 are also in an open state.

The pixel shown in FIG. 8C is different from that of FIG. 8B, that is, the P+ layer 63 is not formed on the surface area of the N+ layer 62 in the photodiode 51, the N+ layer 62 is in contact with the light proof film 67, and the N+ layer 64 of a detection section DN is in contact with the film 67, also. In the present example, the signal charges overflowing from the effective pixel section 40 are flown and absorbed into the photo diode 51, the detection section DN, and, the transistor for reset, because the photo diode 51, the detection section DN and the drain of the transistor for reset are in contact with the light proof film 67.

Second Embodiment

FIG. 9 is a block diagram showing a whole configuration for a CMOS image sensor according to a second embodiment of the present invention. This CMOS image sensor is different from that of the first embodiment shown in FIG. 1 in a configuration in which a second bias generating circuit 90 are added, and a contact relation between the first bias generating circuit 20 and the sensor core section 10 is changed, but other components are the same as each other.

FIG. 10 shows circuit configurations for the sensor core section 10, the VREF generating circuit 17, the first bias generating circuit 20, and the second bias generating circuit 90, which are shown in FIG. 9.

The second bias generating circuit 90 generates a second bias voltage (for example, 1V) used for suppression of vertical-stripe noises generated in the transistor TS1 by dividing the power-supply voltage VDD of 2.8V with a pair of bleeder resistances and by generating a bias voltage with a voltage of 1V which is almost the same level as that of the usual readout voltage from a pixel.

When a pixel signal is output from the effective pixel section 40, random noises caused by 1/f noises of the transistor 53 for amplification in the pixel 50 become large, and effective suppression of vertical stripe noises cannot be realized. Then, a transistor TIN for switching is connected to one end of the vertical signal line 56, that is, to the other side of the load transistor TL across the imaging area 11, and the second bias voltage is supplied to the vertical signal line 56 by putting the transistor TIN into an ON state after changing the control pulse signal DC ON. That is, the vertical-stripe noises can be suppressed not by using the signal of the effective pixel section 40, but by applying the bias voltage to the vertical signal line 56.

Each of the plurality of transistors TIN is inserted between the output node of the second bias generating circuit 90 and corresponding one of the plurality of vertical signal lines 56. And, each of the gate electrodes of the transistors TIN is connected to a second gate control line 58 in common. The control pulse signal DC ON, which is generated in the timing-signal generating circuit 16 shown in FIG. 9, and is used for on-off control of the transistors TIN, is supplied to the second gate control line 58.

In this case, a bias voltage generated by a pair of the bleeder resistances in the second bias generating circuit 90 may be supplied to each of the transistors TIN through an operation amplifier. When the operation amplifiers are used, noises of the power-supply can be reduced, and the vertical signal lines 56 can be driven by low impedance. When the vertical signal lines 56 are driven by low impedance, effective suppression of vertical stripe noises can be more stably realized without effects of random noises in the pixel section 50.

When the bias voltage generated in the second bias generating circuit 90 is supplied to the vertical signal lines 56, it is required to put the load transistors TL into an OFF state without applying the first bias voltage VVL generated from the first bias generating circuit 20 to the first gate control line 57. Therefore, a switching element TLSW is provided in the circuit shown in FIG. 10. The switching element TLSW switches between the output of the first bias generating circuit 20 and the ground voltage for output to the first gate control line 57. When the bias voltage generated in the second bias generating circuit 90 is supplied to the vertical signal lines 56, the switching element TLSW outputs the ground voltage to the first gate control line 57. At this time, the plurality of load transistors TL is put into an OFF state.

Third Embodiment

Figure 11A:
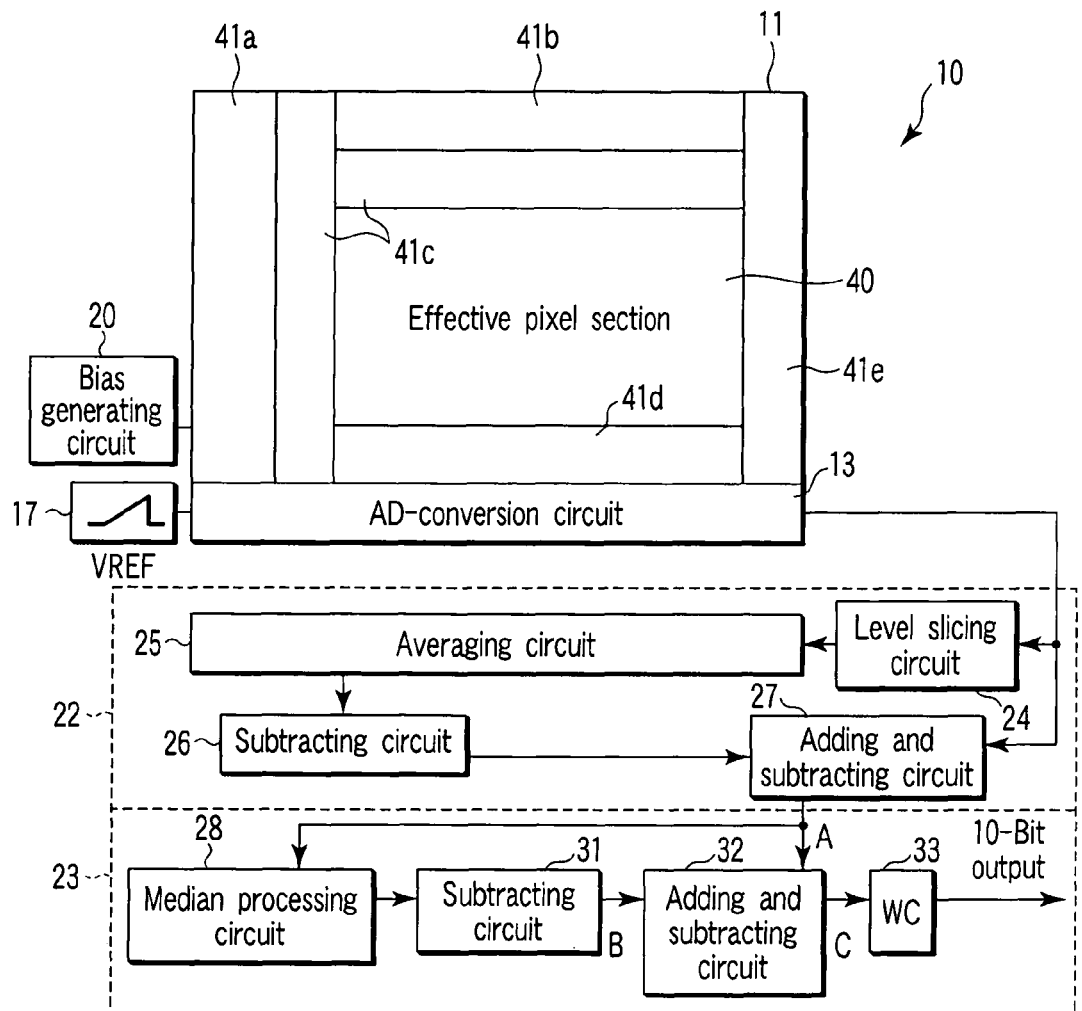
FIG. 11A is a view showing a layout of a sensor core section, and the configuration of a signal processing circuit in a CMOS image sensor according to a third embodiment of the present invention.

FIG. 11A is a view showing a layout of a sensor core section 10, and the configuration of a signal processing circuit 21 in a CMOS image sensor according to a third embodiment of the present invention.

In this CMOS image sensor, the configuration of the sensor core section 10 is the same, and the signal processing circuit 21 includes a vertical-stripe noise suppression circuit 22 and a horizontal-stripe noise suppression circuit 23 in the same manner as the configuration of the CMOS image sensor according to the first embodiment shown in FIG. 2A. However, the configuration of the horizontal-stripe noise suppression circuit 23 is different from that of FIG. 2A. The horizontal-stripe noise suppression circuit 23 includes: a median processing circuit 28; a subtracting circuit 31; an adding and subtracting circuit 32; and, a white clipper (WC) 33. Subtracting circuit 31 subtracts from 64 LSB an average signal SigOB extracted in the median processing circuit 28. The adding and subtracting circuit 32 performs adding and subtracting between output data from the subtracting circuit 31 and effective pixel data on the same horizontal line as a horizontal line which is subjected to median processing.

Vertical-stripe noise suppression in the signal processing circuit 21 shown in FIG. 11A is the same as that of the signal processing circuit 21 shown in FIG. 2A.

The horizontal-stripe noise suppression will be described as follows. That is, since pixel signals are read out from the optical black section 41a at the side on which readout on horizontal lines is started, and median processing for 36 pixels is performed, white stripe noises and random noises are reduced or removed to detect only changes in the levels of the pixel signals in the optical black section 41a. Then, an average signal SigOB extracted in the above median processing is subtracted from 32 LSB (32 LSB−SigOB), and this result is added to or subtracted from the signal of an effective pixel on the same horizontal line in the addition and subtracting circuit 32 for horizontal-stripe noise suppression. In this case, processing is executed in the white clipper 33, because the level of the output signal (full 10 bits of 1023 LSB) of the adding and subtracting circuit 32 is reduced. Assuming that the characteristic of the white clipper 33 is 959 LSB obtained by subtracting 64 LSB from full 10 bits of 1023 LSB, the OB level is multiplied by 1023/959 in a post-stage circuit to obtain 32 LSB×1.07≈34 LSB, which is larger than the AD-conversion output of 32 LSB.

Figure 11B:
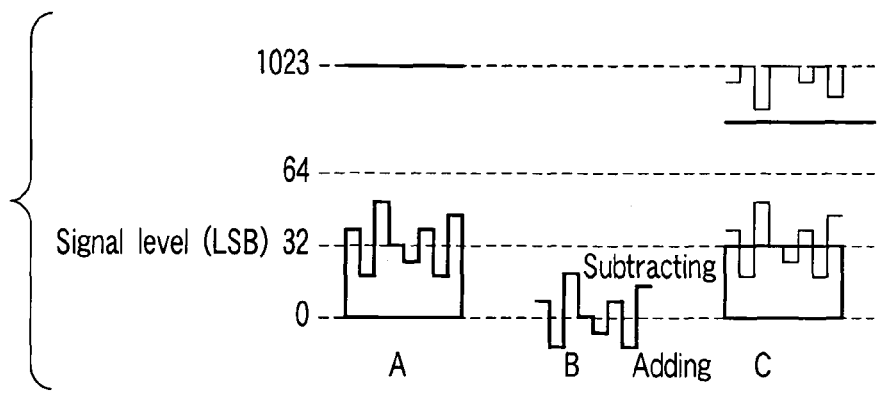
FIG. 11B is a view showing signal waveforms for a principal portion in a horizontal-stripe noise suppression circuit shown in FIG. 11A.

One example of a signal waveform in horizontal-stripe noise suppression is shown with letters A, B, and C in FIG. 11B. The signal A shows a signal for each line in the vertical direction. The signal A has been subjected to vertical-stripe noise suppression. In the signal A, portions which fluctuate, crossing the 32 LSB level, are generated as horizontal-stripe noises. This signal presents fluctuation of the same level for both the optical black section 41a and the effective pixel section 40 existing at the same horizontal line. Therefore, the signal B (solid line) is obtained by detecting level changes of the optical black section 41a and subtracting 32 LSB from the changes. By adding or subtracting the signal B to or from the signal of an effective pixel, the level changes are improved as shown in a signal C, and the OB level can be set at 32 LSB.

In the above-described embodiments, vertical-stripe noises and horizontal-stripe noises in a saturation area generated by operation of vertical-stripe noise suppression and horizontal-stripe suppression are prevented by processing according to which the OB level of the output signal of the AD-conversion circuit 13 is substantially increased when the signal of a sensor is output.

FIGS. 12A and 12B are perspective views showing external appearances of a CMOS image sensor module using the CMOS image sensor according to the above-described embodiments. In FIG. 12A, a package 100, for example, of plastic contains a semiconductor chip 110 which integrates a CMOS image sensor which outputs a digital video signal. The sensor has been explained in the above-described first through third embodiments, and an image signal processor which receives a signal from this CMOS image sensor, and outputs digital luminance signals and digital color signals. The image signal processor may have functions, in addition to the function by which digital luminance signals and digital color signals, such as a white-balance adjustment, a color adjustment, a data compression, and parallel-serial conversion. Moreover, an optical system 120 including, for example, one or more optical lens is provided in front of the package 100, light is led to the CMOS image sensor through the system 120. The CMOS image sensor module shown in FIG. 12A is of a type by which the module is mounted, using a connector 130, and a plurality of terminals formed, for example, on the backside of the package 100 and the connector 130 are electrically connected to each other through a flexible cable 140.

According to the CMOS image sensor module shown in FIG. 12B, the package 100 itself is mounted onto a receptacle in a circuit board without using the connector.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents. For example, although cases, in which suppressions are made for both of vertical-stripe and horizontal-stripe noises, have been explained in the above-described examples, variations in which suppression is made only for one type of noises may be applied.

What is claimed is:

1. A solid-state imaging apparatus comprising:
an imaging area including an effective pixel section and a light proof optical black section being arranged in the imaging area where the light proof optical black section is adjacent to the effective pixel section, wherein the optical black section includes a first optical black section arranged at one end of the imaging area in the vertical direction, and a second optical black section arranged between the effective pixel section and the first optical black section, the effective pixel section includes a plurality of photoelectric transducers which are two-dimensionally arranged, and a plurality of detection sections which generate pixel signals by voltage conversion of signal charges, which are being subjected to photoelectric conversion in the photoelectric transducers, and the second optical black section includes a charge-exhaust-pixel-structure in which signal charges generated from the second optical black section are exhausted in a drain which is supplied with a constant voltage;
an AD-conversion circuit to which pixel signals generated in the imaging area are supplied through a plurality of vertical signal lines, and which converts the pixel signals to digital signals;
a signal processing circuit which receives the digital signals obtained in the AD-conversion circuit, and outputs digital video signals, wherein the signal processing circuit adds or subtracts first digital signals to or from second digital signals, the first digital signals are generated in the first optical black section, and converted in the AD-conversion circuit, the second digital signals are generated in the effective pixel section, and converted in the AD conversion circuit;
a plurality of first transistors having one end, the other end, and a gate electrode, respectively, each of one ends is connected to each of a plurality of vertical signal lines, each of the other ends is connected to the node of the ground voltage, and each gate electrode is connected to a first gate control line in common;
a first bias-voltage generating circuit which generates a first bias-voltage;
a switching circuit which receives the first bias-voltage and the ground voltage, selects one of the both voltages, and outputs selected voltage to the first gate control line;
a second bias-voltage generating circuit which generates a second bias-voltage;
a plurality of second transistors having one end, the other end, and a gate electrode, respectively, the second bias-voltage is supplied to each of one ends, each of the other ends is connected to the plurality of vertical signal lines, each gate electrode is connected to a second gate control line in common; and
a timing signal generating circuit which supplies a control signal for on-off control of a plurality of second transistors to the second gate control line,
wherein the signal processing circuit comprises:
a vertical-stripe noise suppression circuit, which adds and averages digital signals on a plurality of lines, wherein the digital signals are generated in the first optical black section, and converted in the AD-conversion circuit, and adds or subtracts the averaged digital signal to or from digital signals which are generated in the effective pixel section, and are converted in the AD-conversion circuit.

2. The solid-state imaging apparatus according to claim 1, wherein the first optical black section includes only a plurality of detection sections.

3. The solid-state imaging apparatus according to claim 1, wherein the vertical-stripe noise suppression circuit comprises:
   an adding and averaging circuit which adds in the vertical direction and averages digital signals on a plurality of lines in the vertical direction, wherein the digital signals are generated in the first optical black section and are converted in the AD-conversion circuit; and
   a adding and subtracting circuit which adds or subtracts the output of the adding and averaging circuit to or from digital signals generated in the effective pixel section and converted in the AD-conversion circuits.

4. The solid-state imaging apparatus according to claim 3, wherein the vertical-stripe noise suppression circuit further comprises:
   a level slicing circuit in which, when values of digital signals, which are converted in the AD-conversion circuit, on a plurality of lines are larger than a first reference value, or smaller than a second reference value, which is smaller than the first reference value, the values of digital signals on said plurality of lines are sliced at the first reference value or the second reference value for output to the adding and averaging circuit.

5. The solid-state imaging apparatus according to claim 3, wherein the vertical-stripe noise suppression circuit further comprises:
   a subtracting circuit which supplies a value obtained by subtracting a constant value from the output of the adding and averaging circuit to the adding and subtracting circuit.

6. The solid-state imaging apparatus according to claim 1, wherein
   the vertical-stripe noise suppression circuit adds and averages digital signals on a plurality of lines in the vertical direction, wherein the digital signals are converted in the AD-conversion circuit under a state in which the pixel signals generated in the imaging area are not supplied, and adds or subtracts the averaged digital signal to digital signals generated in the effective pixel section, and converted in the AD-conversion circuit.

* * * * *